March 12, 1963
E. S. TUPPER
3,081,010
PITCHER AND COVER
Filed Jan. 4, 1960
5 Sheets-Sheet 1
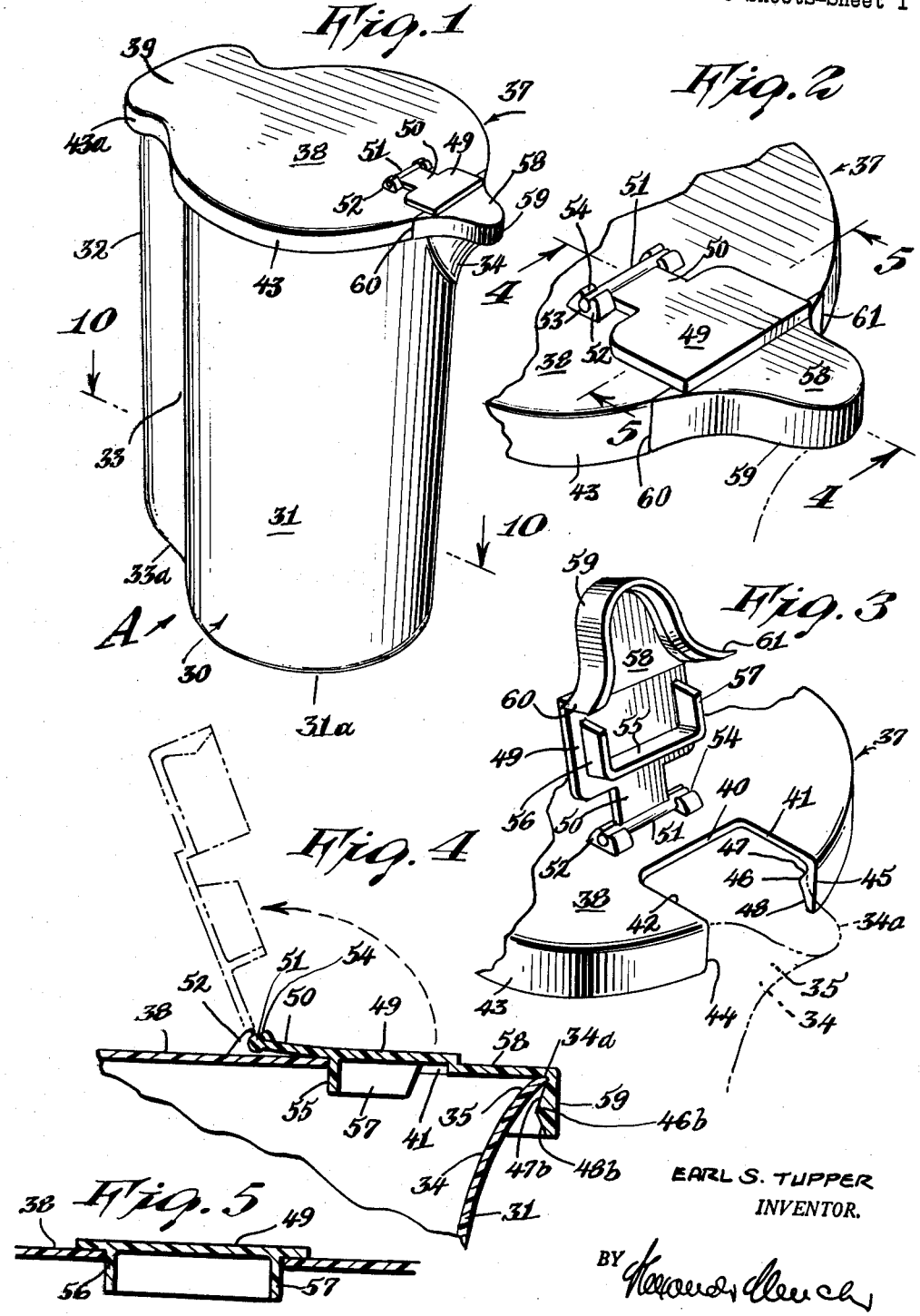
EARL S. TUPPER
INVENTOR.
BY
ATTORNEY March 12, 1963
E. S. TUPPER
3,081,010
PITCHER AND COVER
Filed Jan. 4, 1960
5 Sheets-Sheet 2
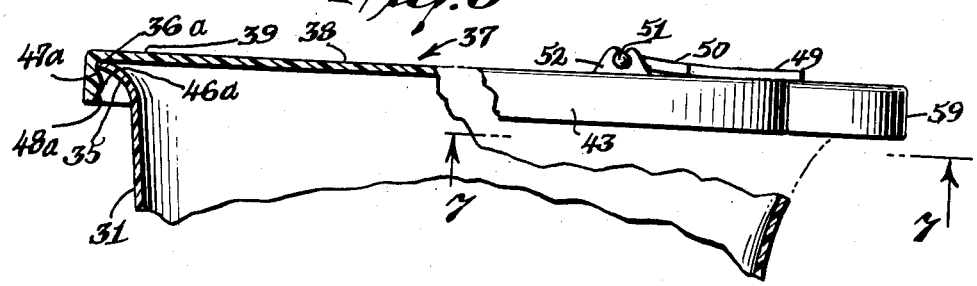
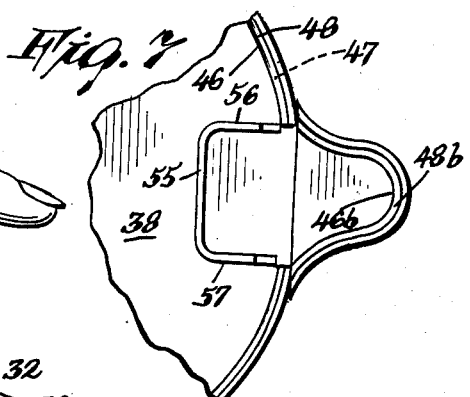
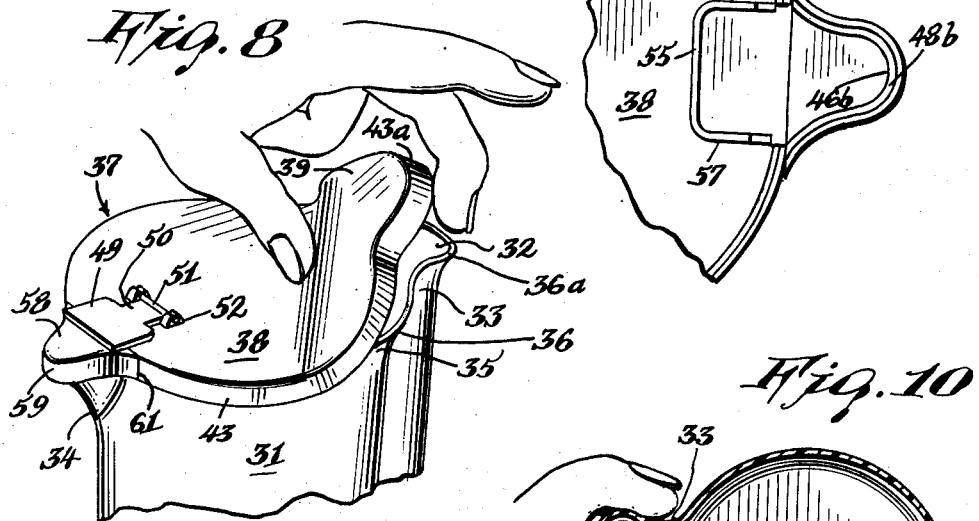
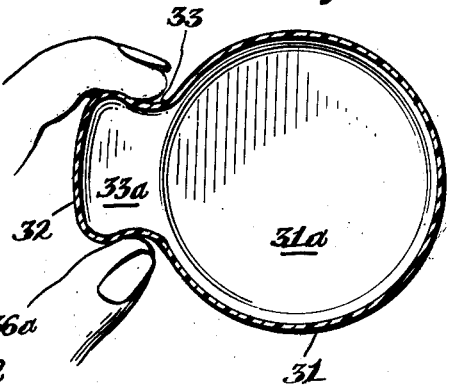
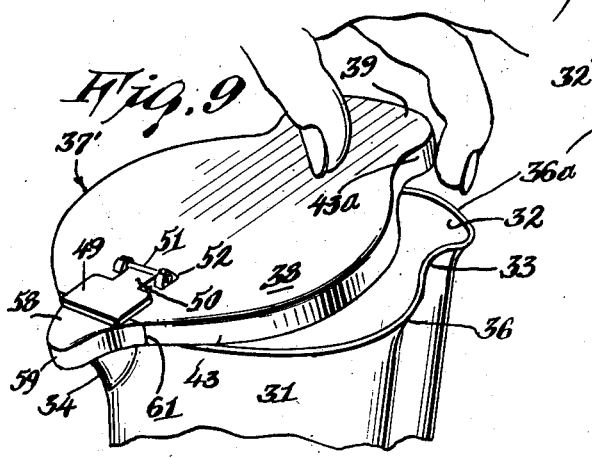
EARL S. TUPPER
INVENTOR.
BY
ATTORNEY

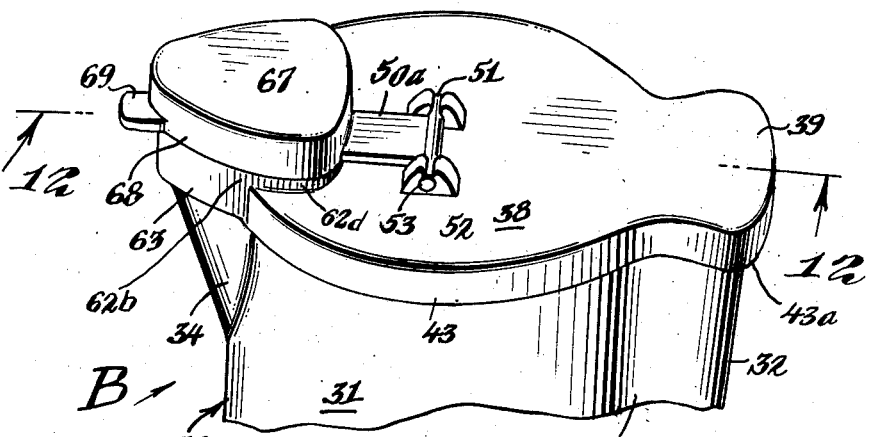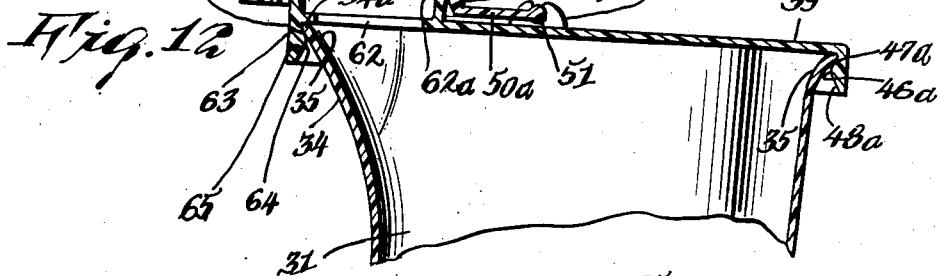

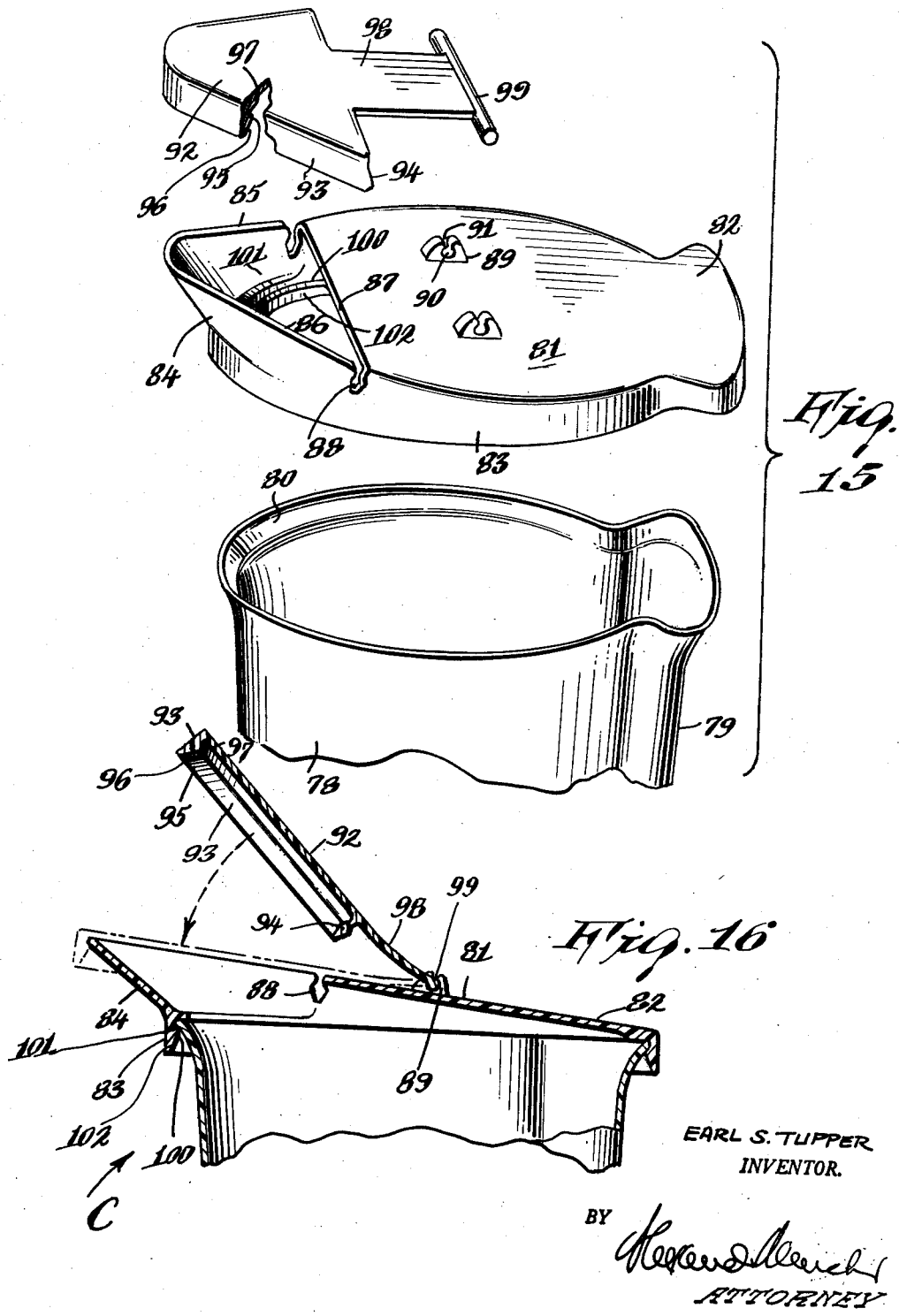

March 12, 1963
E. S. TUPPER
3,081,010
PITCHER AND COVER
Filed Jan. 4, 1960
5 Sheets-Sheet 5
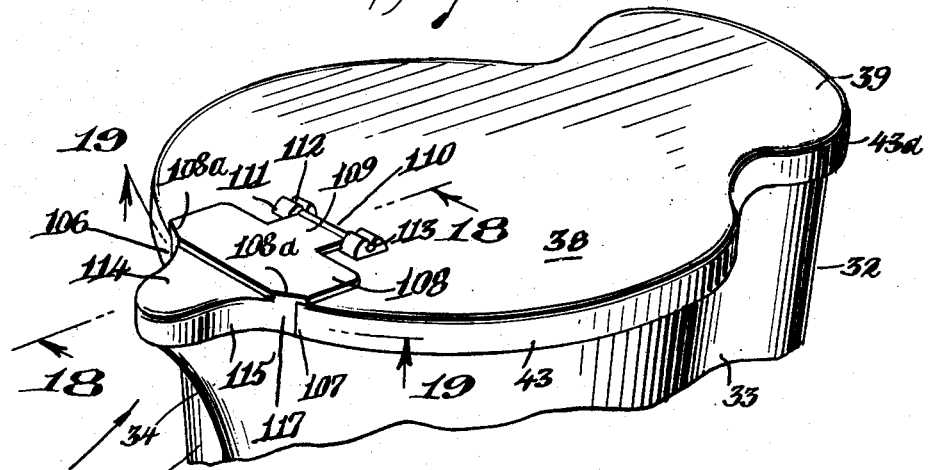
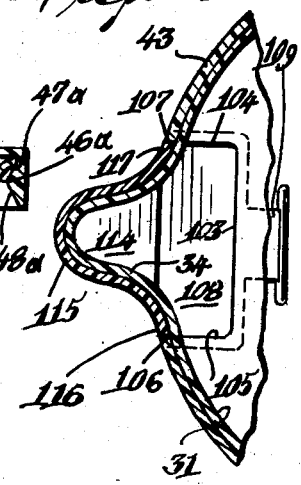
INVENTOR.
EARL S. TUPPER
BY
ATTORNEY

United States Patent Office 3,081,010
Patented Mar. 12, 1963

3,081,010
PITCHER AND COVER
Earl S. Tupper, Esmond, R.I., assignor to Rexall Drug and Chemical Company, Los Angeles, Calif., a corporation of Delaware
Filed Jan. 4, 1960, Ser. No. 297
3 Claims. (Cl. 222—512)

This invention relates generally to covered hollow vessels including pitchers and canisters provided with independently sealable pouring spout elements; but more specifically to a type of vessel wherein the frictional and sealing joint formed by and between the several members is rigid owing to at least one of the joint cooperating members being formed of a high density olefinic polymer or copolymer.

Such polymers as high density polyethylene and high density polypropylene, at least after a molding operation, afford (1) internal properties of substantial rigidity and (2) surface properties of resilient deformability. Consequently, joints and couplings including such materials afford gasketing effects as has heretofore been disclosed in applicant's invention covered by U.S. Patent No. 2,859,786 and dated November 11, 1958.

An object of the present invention, therefore, is to improve the structure of covered vessels, pitchers and canisters having independently sealable pouring spout elements for efficient, sturdy, safe and durable operation in the disposal, storage and transportation of fluid and comminuted contents of low and high weight loads in household and domestic, industrial, commercial and other fields.

Another object of the invention resides in cover structure in cooperation with the complementary vessel, pitcher or canister structure of all regular and irregular shapes which is effective to afford a rigid, substantially seal-tight and strong joint therewith and wherein said cover structure further affords a spout function in association with the vessel.

This application is a continuation-in-part of U.S. Patents 2,950,847, 2,842,167 and 2,859,786; and an improvement of applicant's inventions, covered in: U.S. Patent No. 2,487,400 dated November 8, 1949; U.S. Patent No. 2,610,490 dated September 16, 1952; U.S. Patent No. 2,764,199 dated September 25, 1956; U.S. Patent No. 2,789,608 dated April 23, 1957; U.S. Patent No. 2,842,167 dated July 8, 1958.

Although pitchers, canisters, covers and spout elements for storage and dispensing purposes have been and are in present use, drawbacks have been recognized such as loose connections owing to failure of frictional fits, difficult removability or separation of parts, exposure of vessel contents to surrounding atmospheric conditions, inadequate spout closures, decomposition of residual vessel content portions remaining in exposed areas after dispensing and contamination between the vessel contents and the vessel parts, and difficulty in cleaning the cover and spout elements.

Such drawbacks are not only overcome by the instant invention but other objects and advantages of the invention will hereinafter appear in the progress of the disclosure and as pointed out in the appended claims.

Accompanying this specification are drawings showing several forms of the invention wherein:

FIGURE 1 is a view in perspective of one form of the invention showing a vessel having a spout and a cover in closed relationship, the cover being provided with a spout closure also in closed position;

FIGURE 2 is a fragmentary view in perspective of said cover and spout closure, the latter being in closed position;

FIGURE 3 is a fragmentary view in perspective similar to FIGURE 2 showing the spout closure in open position and associated with a vessel shown in phantom;

FIGURE 4 is a fragmentary sectional view of FIGURE 2 across the plane 4—4 and wherein the spout closure is shown in open position as well as in phantom;

FIGURE 5 is a fragmentary sectional view of FIGURE 2 across the plane 5—5 thereof;

FIGURE 6 is an enlarged side view of the upper part of the device of FIGURE 1 shown partly in section;

FIGURE 7 is a fragmentary bottom plan view of FIGURE 6 across the plane 7—7;

FIGURE 8 is a fragmentary view in perspective of the device of FIGURE 1 showing the initial step for removing the cover member from the vessel when said cover member is formed of flexible material;

FIGURE 9 is a view similar to FIGURE 8 showing the initial step for removing the cover member when said cover member is formed of substantially rigid material;

FIGURE 10 is a sectional view of FIGURE 1 across the plane 10—10 thereof;

FIGURE 11 is a fragmentary view in perspective of a second form of the invention and showing both the vessel and cover provided with spout elements and the cover with a spout closure, all parts being in closed position;

FIGURE 12 is a sectional view of FIGURE 11 across the plane 12—12 thereof;

FIGURE 13 is a fragmentary view in perspective of the second form as shown in FIGURE 12 with a modified form of spout closure, the latter being in open position;

FIGURE 14 is a view in perspective per se of the spout closure illustrated in FIGURE 13;

FIGURE 15 is an exploded view in perspective of a third form of the invention wherein the vessel is in the form of a canister, wherein the cover member is provided with an opening and a spout element; and wherein the spout closure member is attachable to the cover member;

FIGURE 16 is a sectional view of the parts shown in FIGURE 15 assembled but with the spout closure in open position;

FIGURE 17 is a fragmentary view in perspective of a fourth form of the invention similar to the first form shown in FIGURE 1 and modified thereover in the structure of the spout closure and other associated elements;

FIGURE 18 is a sectional view of FIGURE 17 across the plane 18—18 thereof;

FIGURE 19 is a sectional view of FIGURE 17 across the plane 19—19 thereof:

FIGURE 20 is a view in perspective of the device of FIGURE 17 showing the spout closure in open position and the vessel in pouring position.

In accordance with the invention and the preferred forms shown, embodiment A shown in FIGURES 1–10 illustrates a hollow vessel generally indicated by numeral 30. The vessel is of any desired shape but as shown has a hollow and content communicating handle member. Thus, the vessel having a side wall 31 and a bottom wall 31a is shown to have an offset intermediate side wall portion 32 joined to the side wall by inwardly extending finger gripping portions 33 and by a bottom wall 33a. As shown bottom wall 33a is spaced above the bottom of the vessel.

Vessel side wall 31 is formed with a protruding spout 34, the upper open edge 34a thereof being in the same horizontal plane with vessel side wall open top edge 36 and handle portion open top edge 36a, all of said edges being integrally continuous and forming the top peripheral edge of vessel 30 as shown best in FIGURES 3 and 9. Said compositie and continuous peripheral open top edge 34a—36—36a forms the upper terminal of an integrally continuous and outwardly flared upper portion 35 of the vessel 30 including portions of spout 34, side wall 31 and handle 32—33—33a respectively.

As shown, the outwardly flared upper portion 35 of vessel 30 terminating in said continuous edge 34a—36—36a constitutes curved peripheral rim portions tangentially continuous and of dissimilar curvature for tight, frictional and continuous sealing engagement with the peripheral engaging skirt of a correspondingly shaped cover member at the perimeter, said cover member generally being indicated by numeral 37, such type of engagement having been heretofore disclosed in applicant's invention covered by the aforestated U.S. Patent No. 2,789,608.

A cover member for embodiment A and indicated by numeral 37 is removable and serves as a seal-tight, live, and frictional engageable closure for vessel 30 and the communicating hollow handle. The spout is closed, however, by an independent live and frictionally engageable closure as will appear.

Cover member 37 has a top wall 38, flat as shown, has an extending portion 39 for overlying the handle mouth (see FIGURES 8 and 9), and axially opposite is an inwardly extending notch for straddling and extending spout 34 as seen in FIGURE 3. The notch as shown is rectangular having a rear wall 40 and side walls 41 and 42, the latter terminating forwardly at the spaced edges 44 and 45 (see FIGURE 3) of a continuous skirt 43—43a depending from the cover top wall 38 and wall extension 39.

Skirt 43—43a adapted to engage the flared portions 35 of vessel wall 31 and handle walls 32 and 33, at the inner face has an intermediate continuous annular rim 46 and 46a from which inner face wall portions are oppositely sloped as at 47 and 48 and 47a and 48a. The lower inner face wall portions 48 and 48a serve to effect registration with and entry of vessel and hollow handle edges 36 and 36a for forceably clearing the annular rims 46 and 46a whereupon the cover member snaps into engagement with the vessel. A live, seal-tight, frictional, positive, and durable joint is effected between the vessel edges 36—36a and skirt wall faces 47—47a. To effectuate such joint characteristics, the overall dimensions of vessel edges 36 and 36a exceed the largest overall dimensions of skirt wall faces 47 and 47a and the overall dimensions of annular rims 46 and 46a.

Vessel 30 is formed of an inert plastic preferably not requiring chemical plasticizers for contamination prevention of the contents. Moreover, it is desirable that such vessel be relatively rigid and also present at the juncture with the cover member a deformable surface for live, frictional and seal-tight engagement. For this reason, a high density olefinic polymer or copolymer including polyethylene and polypropylene is preferably utilized for molding the vessel. On the other hand, the cover member 37 may be molded of the same plastic material for giving added rigidity to the junction with the container; or may be formed of less rigid and resiliently flexible material including the low density olefinic polymers and copolymers as locally deformable polyethylenes and polypropylenes.

The independent and openable closure for spout 34, associated with cover member 37 and operable therewith when said cover member is in sealing engagement with vessel 30, is adapted to sealably engage and overlie the cover notch having walls 40, 41 and 42, to bridge and seal the opening of cover skirt 43 between open edges 44 and 45 and to sealably engage the flared edge 35 of spout 34 as seen in FIGURES 2-4. Moreover, as seen in embodiment A, the closure is in removable and hinged engagement with cover 37.

The spout closure is preferably molded or formed of the same material as cover member 37 and comprises a main body 49 adapted to overlie contact, seal and extend beyond the edges 40, 41 and 42 of the cover top wall notch. Body 49 is further provided with a rear tongue extension 50 having in connection with cover top wall 38 a hinge element such as an integral and projecting pintle 51 of larger diameter than the thickness of body 49 and formed as the rear edge of said extension. The pintle 51 is adapted to slide in and out of a pair of spaced lugs 52 secured to cover top wall 38 and having aligned openings 53 for lateral pintle passage therethrough. Lugs 52 also have top entry notches 54 (see FIGURE 2) for openings 53 whereby body 49 may pass therethrough during lateral introduction and removal of pintle 51 in the lugs 52.

As shown in embodiment A, closure body 49 inwardly of the edges is provided with a depending U-shaped skirt having a rear wall or base 55 and side arms 56 and 57 for centering with and for frictional engagement with the corresponding notch edge walls 40, 42 and 41 respectively. Body 49 is further provided with a forward and down-stepped extension 58 having a perimetric shape corresponding to spout open top edge 34a and also having a depending skirt 59 to frictionally and sealably engage the flared edge portion 35 of spout 34. The inner face of skirt 59 has similar structure as the inner face of cover skirt 43 and 43a and performs functions with respect to spout 34 similar to the functions of skirt 43 and 43a with respect to vessel 30 and the hollow handle 32—33—33a. Thus, skirt 59 also has an intermediate rim 46b and oppositely sloping walls herefrom 47b and 48b.

In order that closure skirt 59 in the embodiment A sealably and frictionally engage skirt 43 for live connection therewith and to impose downward pressure on closure body 49 against the upper face of cover member top wall 38, end extensions 60 and 61 are provided to overlap cover skirt edges 44 and 45, said extensions conforming in curvature with skirt 43 and having tangential inner faces in contacting relationship with the outer face portions of skirt 43 adjacent ends 44 and 45 as shown in FIGURE 3.

In applying and removing the cover member 37 for the vessel 30 when said cover is of resiliently flexible plastic as seen in FIGURE 8, the cover may be aligned with the vessel top open edge 36—36a and forced thereover for snapping engagement. A suitable procedure is to first fit cover skirt portion 43a over the handle open top edge 36a for engagement therewith and then to force the remainder of skirt 43 over vessel top edge 36 for snapping engagement with the vessel flared wall portion 35. It is understood that the flare 35 in the vessel 30, handle 32—33 and spout 34 may be substituted by a beaded edge as is conventional.

In applying cover member 37 to vessel 30 as aforesaid, it is preferable that the closure be in open position during the operation as seen in FIGURE 3, and be independently closed by snap engagement thereafter for maintaining complete sealing of the contents.

In removing the cover member 37 from vessel 30, it has been found most suitable to first flex and then lift the cover from the "heel" part as at 43a, and then to pull off the rest of the cover as seen in FIGURE 8.

When the cover member is formed of substantially rigid plastic as indicated by numeral 37' in FIGURE 9, the same procedure is followed except that in removal, the "heel" part as at 43a is not flexed as seen in FIGURE 8.

In the second form of the invention illustrated as embodiment B in FIGURES 11-14, a modified form of cover and closure member is shown. Structure corresponding to embodiment A is indicated by corresponding reference characters.

Thus, the cover notch opposite spout 34 is indicated by numeral 62 but is provided with a surrounding flared vertical spout engaging wall 62a and an extension 62b thereof beyond cover skirt 43 to serve as a spout mouth extension. Extension 62b has a depending portion 63 joining cover skirt 43 and is provided on the inner face with a rim portion 64 and oppositely sloped sides 65 and 66 to correspond and be continuous with the rim 46 and the oppositely sloped sides 48 and 47 respectively of vessel 30. Portion 63 is adapted to engage the flared edge 35 of spout 34 as seen in FIGURE 12.

A cover for the spout mouth extension 62a—62b—63 is shown in FIGURES 11 and 12 as of the hinge type and consists of a top wall 67, a peripheral skirt 68, a forward engaging tab 69 and a rear tongue 50a carrying pintle 51 for hinged engagement with lugs 52.

The inner face of skirt 68 has a peripheral rim 70 and oppositely sloped walls 71 and 72 for snapping and sealing engagement with the flared walls of spout mouth extension 62a—62b.

A modified and captive type of cover for spout mouth extension 62a—62b is shown in FIGURES 13 and 14. Thus, the cover cap has a top wall 73, a peripheral skirt 74, a front tab 75, and extension strap 76 to permit the cap to be secured to retaining ring 77 at the base of the spout extension 62a—62b on cover member top wall 38.

A third embodiment of the invention designated C and shown in FIGURES 15 and 16 illustrates a vessel 78, a hollow handle 79 continuous therewith and a continuous or peripheral flared upper rim 80.

In embodiment C vessel 78 is not provided with a spout, the spout being afforded only by a vessel cover. Thus, the cover has a top wall 81, a top wall extension 82 for the hollow handle mouth and a peripheral vessel engaging skirt 83. Forwardly of the vessel engaging skirt 83 and opposite extension 82 is an upper and flared spout wall extension 84 having continuous top side free edges 85 and 86 and a rear edge 87. As shown, the open mouth of the spout is formed from a forward sectional cut-out of cover top wall 81, the latter sloping upwardly from the "heel" or handle covering part 82 and thereby effecting variation in the height of skirt 83.

A closure or cover member for the spout mouth is provided and as shown is of the hinged type for engagement with spaced lugs 90 of cover top wall 81 and having pintle openings 90 and an entry notch 91 for a pintle of the spout closure.

The spout closure in embodiment C of FIGURES 15 and 16 has a top wall 92, a skirt 93 for engagement with the side flared edges 84 of the spout mouth and a rear skirt 94 of keyed section. Adjacent the junctions of spout mouth open edges 85—86 and 87 and on cover skirt 83 are downwardly extending and similarly key-shaped notch sockets 88 for frictionally and tightly engaging the end portions of closure rear skirt 94.

The inner face of skirt 93 as shown is formed with an intermediate rim 95 and oppositely sloped walls 96 and 97 for snap, live and tight engagement with the flared spout wall 84, the open rear edge 87 being in tight, flush and abutting engagement with rear skirt 94.

The closure has a rear tongue 98 for hinged connection to lugs 89 by means of tongue pintle 99 removably engageable with the lug openings 90.

The main cover skirt 83 is adapted to frictionally and sealably engage vessel 78 by snap engagement as heretofore described in the other embodiments. Thus, the inner face of skirt 83 peripherally and in parallelism with the lower edge is provided with an intermediate rim 100 and oppositely sloped walls 101 and 102.

A fourth embodiment of the invention D is shown in FIGURES 17–20 and is similar to the structure of embodiment A shown in FIGURES 1–10 but with omission of the closure depending intermediate skirt 55—56—57 for the notch edges 40, 42 and 41 and the omission of the lateral extensions 60 and 61 of the closure skirt 59.

In connection with description of embodiment D, structures similar to those of embodiment A are indicated by corresponding reference characters.

Thus, the top wall 38 of the cover member is provided with a notch adjacent spout mouth edge 34a and has a rear edge 103 and shorter side edges 104 and 105, said side edges communicating with the terminal edges 107 and 106 respectively of cover member skirt 43. Said terminal edges 106 and 107 are adapted to engage vessel flared rim 35 at the junctions with the ends of spout wall 34.

The closure for the said notch and spout mouth has a body 108 adapted to overlie the notch edges 103, 104 and 105 and has a rear tongue extension 109 terminating at the rear edge in a pintle 110 having projecting ends and of larger diameter than the thickness of body 108. The pintle 110 is adapted to be hingeably secured to lugs 111 on cover top wall 38 through lug openings 113. An entry notch 112 is provided into each of said lug openings 113 to permit lateral passage of pintle 110 and of tongue 109 for introduction and removal of the closure.

Closure body 108 adapted to overlie the notch of cover member 38 has rounded portions at the forward edges as at 108a and extending forwardly from the inner ends of said rounded portions is a closure body extension 114 for spout mouth edge 34a. Said extension 114 is provided with a depending skirt 115 having extending end portions 116 and 117 terminating intermediate the length of and secured to rounded portions 108a as best seen in FIGURES 17, 19 and 20. The inner face of skirt 115 and extensions 116 and 117 are provided with an annular rim 118 and oppositely sloped walls 119 and 120 for frictional, sealable and snap engagement with the spout mouth edge 34a and to thereby maintain closure wall 108 over the cover notch in contacting relationship with the cover top wall 38.

As a result of the structure described and with proper dimensional requirements satisfied, the cover member edges 106 and 107 of skirt 43 are in abutting, flush, live and tight engagement with the terminal edges 122 and 121 as best indicated in FIGURES 18–20, when the spout closure is in closed position. Such flush engagement serves to center the closure and to afford a similar function to intermediate skirt 55—57 of embodiment A in FIGURE 3. In such position, moreover, extensions 116 and 117 are oppositely and tangentially curved continuations of skirt 43, and curved top wall edges 108a overlie and extend oppositely of and tangentially with the curvature of cover member top wall 38 as best seen in FIGURE 17.

The flush abutment between edges 121 and 107 and edges 122 and 106 of skirt 115 and main cover skirt 43 is made by suitably angled facings.

The vessel, cover and spout closure parts above described may be molded by standard resin-molding techniques. However, when a substantially rigid part is formed of metal, glass, composition or other non-resinous material, the other complementary and engageable part is formed of resinous material as mentioned to effectuate a live, seal-tight, frictional and disengageable joint.

Futhermore, each of said parts is constructed and shaped for easy assemblage and disassemblage with the other parts, for easy accessibility to cleaning and washing, for natural draining or shedding of clinging or residual vessel contents after each use of the device, and for elimination of dirt and vessel content collecting traps.

Additionally, the cover member being engageable with the vessel at a rigid, strong and pressure-resistant joint, same serves as an ice-guard for chilled fluid contents when pouring is effected through the spout of the device.

It is understood that minor changes and modifications in the material, location, integration, shape, size of parts and all types of molding including injection, compression and vacuum may all be resorted to without departing from the spirit of the invention and the scope of the appended claims.

I claim:

1. A pitcher, cover and cap combination including an open top pitcher; the upper edge of the pitcher being flared outwardly; a pouring spout extending transversely outwardly from said pitcher, said pouring spout being integral and continuous with the side wall of the pitcher;

the upper edge of the pouring spout being flared outwardly and forming a continuation of the upper edge of the pitcher; a flanged cover for said pitcher positionable on said upper edge of the pitcher, an opening in said cover having outer portions terminating short of said pouring spout but adjacent said pouring spout; a downwardly directed short flange affixed to the outer continuous edge of said cover; an inwardly sloping wall on the side of said flange facing the pitcher, said sloping wall conforming substantially with and tightly engaging the outside of said flared upper edge of the pitcher; a cap pivotally mounted on said cover and swingable from an open position to a closed position, said cap including a substantially flat plate overlying said opening in the cover, a second downwardly directed short flange affixed to a said flat plate of said cap and conforming to said flared upper edge of the pouring spout, an inwardly sloping wall on the side of said second flange facing said pouring spout, said sloping wall conforming substantially with and tightly engaging the outside of said flared upper edge of the pouring spout; and said second flange forming a continuation of said flange on the cover thereby sealing the contents of the pitcher.

2. A pitcher, cover and cap combination according to claim 1 including extensions on said cap overlying portions of said cover immediately surrounding said opening.

3. A cover and closure combination for use on a container having bottom and side walls and a top opening, the top of said side wall having outward extensions forming a peripheral rim at said opening, a pouring spout integral with and extending transversely outwardly from said side wall and forming an extension part of said top opening, an extension of said rim along said pouring spout; said cover overlying a major portion of said top opening and terminating short of and adjacent to said pouring spout; a downwardly directed flange integral with the underside of the cover; said flange resiliently and tightly engaging said rim to releasably unite the cover and container; a closure swingably mounted on said cover and movable to and from open and closed positions; said closure overlying said extension part of the top opening when the closure is in closed position; a downwardly directed flange integral with the underside of said closure, and said flange resiliently and tightly engaging said extension of the rim to releasably close said pouring spout to seal the contents of said container.

References Cited in the file of this patent

UNITED STATES PATENTS

| | | |
|---|---|---|
| 2,169,547 | Walz | Aug. 15, 1939 |
| 2,253,177 | Hacmac | Aug. 19, 1941 |
| 2,690,852 | Schuler | Oct. 5, 1954 |
| 2,741,402 | Sayre | Apr. 10, 1956 |
| 2,805,561 | Emmert et al. | Sept. 10, 1957 |
| 2,832,517 | Baumgartner | Apr. 29, 1958 |
| 2,842,167 | Tupper | July 8, 1958 |
| 2,859,786 | Tupper | Nov. 11, 1958 |